United States Patent [19]

Sheppard

[11] 4,294,161

[45] Oct. 13, 1981

[54] POWER STEERING GEAR WITH OIL FILLED CAPILLARY BALANCING SLOTS

[76] Inventor: Peter H. Sheppard, c/o R. H. Sheppard Co., Inc., Hanover, Pa. 17331

[21] Appl. No.: 974,347

[22] Filed: Dec. 29, 1978

[51] Int. Cl.³ ............................................. F15B 11/08
[52] U.S. Cl. ........................................ 91/422; 91/378; 91/380; 92/127; 92/159; 92/DIG. 2; 251/282
[58] Field of Search ........... 92/160, 126, 127, DIG. 2; 91/378, 380, 422; 251/282; 137/625.69

[56] References Cited

U.S. PATENT DOCUMENTS

| | | | |
|---|---|---|---|
| 2,449,297 | 9/1948 | Hoffer | 92/127 |
| 3,092,083 | 6/1963 | Sheppard | |
| 3,142,262 | 7/1964 | Firth | 92/127 |
| 3,585,906 | 6/1971 | Emmasingel | 92/127 |
| 3,722,369 | 3/1973 | Maekawa | 91/380 |
| 4,088,063 | 5/1978 | Sheppard | 92/127 |

OTHER PUBLICATIONS

Lubrication and Lubricants, Archbutt & Mountford Deeley-London, Charles Griffin & Co., Ltd., 1900, pp. 43-45.

*Primary Examiner*—Abraham Hershkovitz
*Attorney, Agent, or Firm*—Lowe, King, Price & Becker

[57] ABSTRACT

An integral power steering gear assembly includes a piston and cylinder combination having greater output efficiency through improved fluid balancing and cushioning of the piston at its ends. The improved cushioning utilizes oil capillary slots in lieu of previously proposed epoxy resin strips. The slots may be fed with high pressure fluid filled by feed grooves along the sides of the piston adjacent the output rack. The slots are designed to have a shallow depth, preferably 0.001 inch-0.0025 inch, which is sufficient to provide for high capillary attraction of the oil molecules to the slot. The trapped oil molecules prevent slip stick action, that is molecular interaction between the piston and cylinder wall, but at the same time, the oil molecules remain trapped or isolated within the walls of the slot thereby minimizing leakage from the slot. The operating oil is delivered with higher efficiency in the power steering unit by a bifurcated oil delivery passage communicating with the inlet slot of the piston. This provides fluidized balance and cushioning of the valve within the piston, and also prevents starvation of the high pressure feed grooves and capillary slots for balancing and cushioning the piston within the cylinder. Accordingly, improved reversibility of both the piston and the valve are obtained.

10 Claims, 6 Drawing Figures

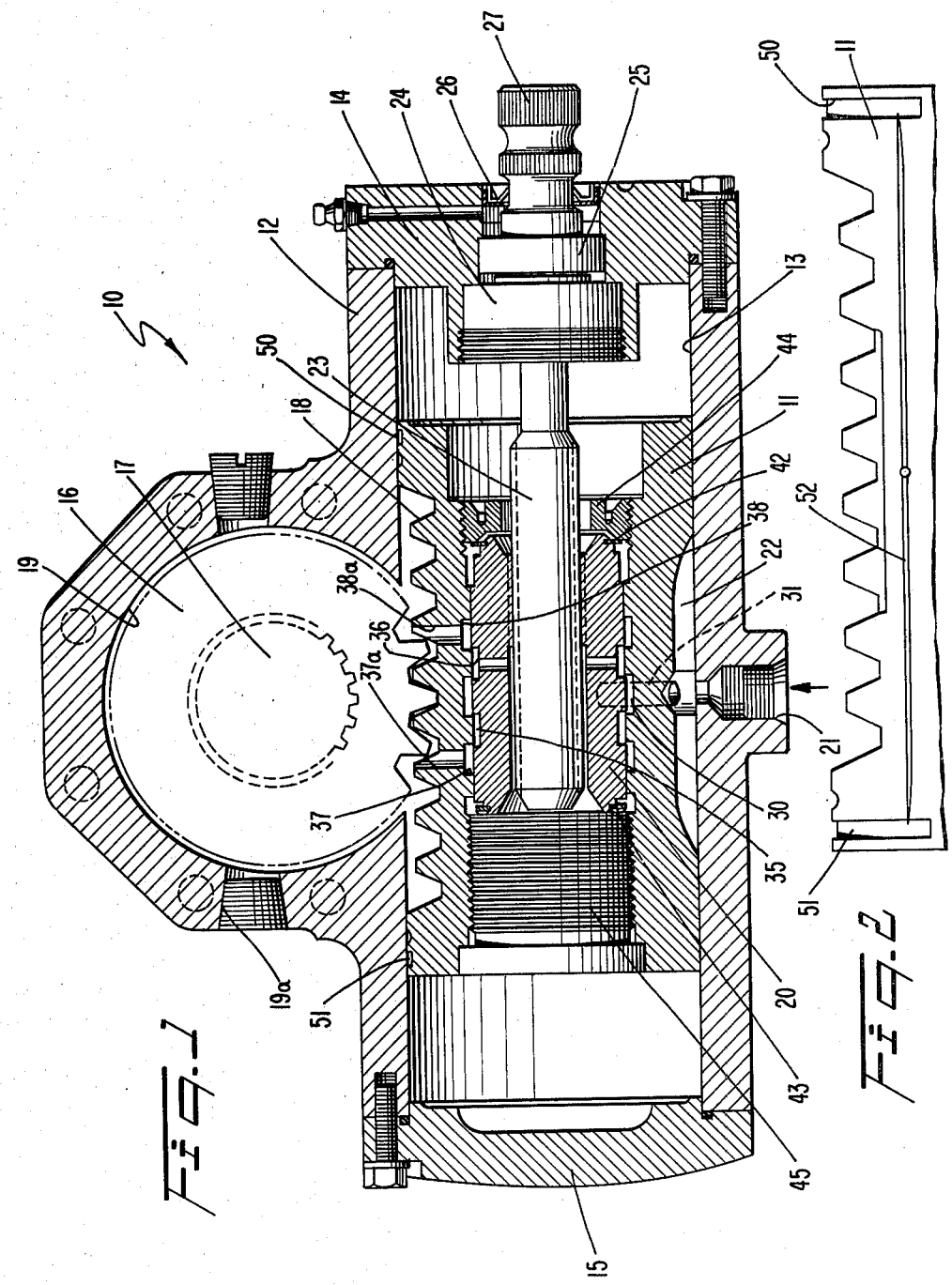

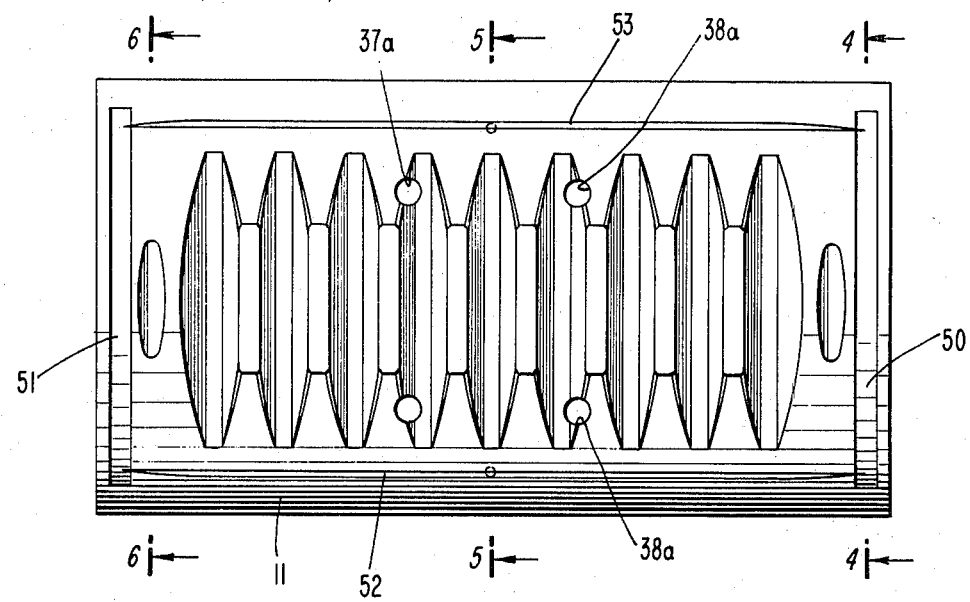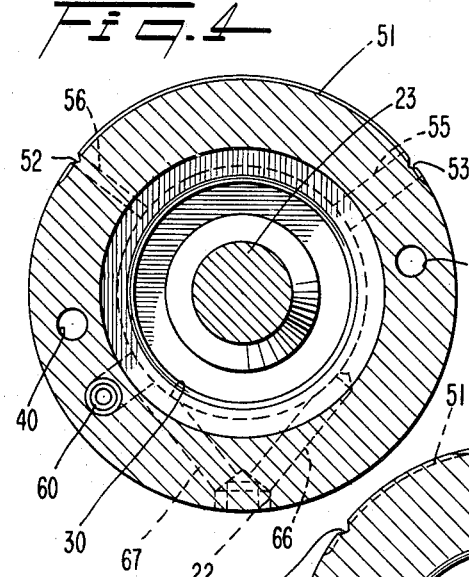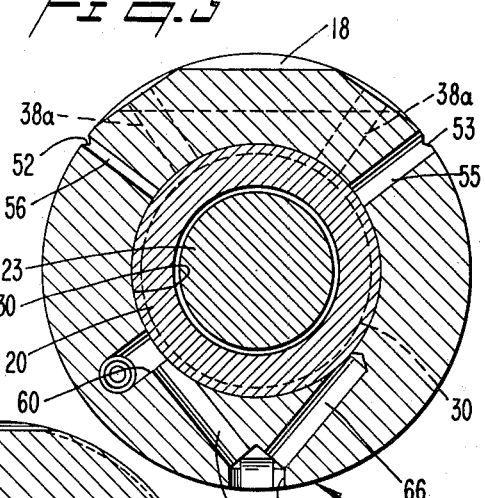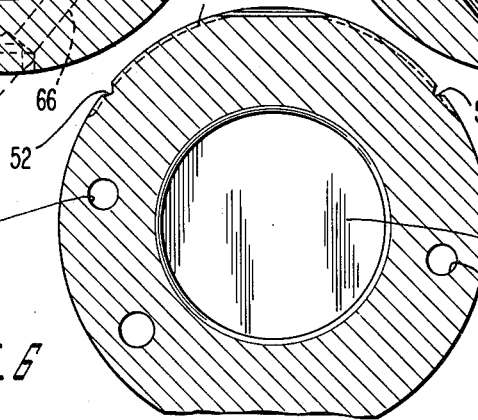

POWER STEERING GEAR WITH OIL FILLED CAPILLARY BALANCING SLOTS

TECHNICAL FIELD

The present invention relates to integral hydraulic power steering gears, and more particularly, to a power steering gear having oil distribution and cushion features for improvement of the efficiency of operation of the piston within the cylinder and the distributing valve within the piston.

BACKGROUND ART

The most efficient power steering gear assembly in production today is the gear having a spool-type distributing valve within the piston. The Sheppard Power Steering System providing this basic concept is first disclosed and claimed in previous U.S. Pat. No. 3,092,083, Sheppard, which patent is exclusively licensed to the same licensee as the invention covered by the present application. This basic design introduced in the early 1960's has been improved upon several times. One of the main areas of recognized improvement is in the area of reducing the frictional forces between the piston and the cylinder and/or the valve and the valve bore within the piston and thereby improving the reversibility of the gear.

A major breakthrough improvement in this area is represented by the Sheppard U.S. Pat. No. 4,088,063, issued May 9, 1978 and also exclusively licensed to the same licensee, R. H. Sheppard Co., Inc., Hanover, Pennsylvania. This generation of gears was first introduced in the middle 1970's and has proved to be highly efficient and effective in providing greater steering efficiency. Truck manufacturers using this generation of gears have been able to appreciably reduce the size and weight of the power steering unit and at the same time gain improved efficiency to handle the larger and larger vehicles carrying the greater and greater payloads of today.

In the gear built under the Sheppard '063 patent, the superior reversibility (change or beginning of movement) of the valve within the piston and the piston within the cylinder results from several unique concepts. First, longitudinal fluid bearing grooves are provided along the side of the piston opposite the pressurized fluid input groove to cushion the piston and balance the opposing forces of the pressurized oil delivered to the power steering gear. The oil between the piston and cylinder provides a separating film between the adjacent like metal surfaces, thus preventing sticking action between the parts and minimizing wear. Additional lubricating ports (advantageously positioned to eliminate unwanted bleeding between the high pressure and the low pressure hydraulic fluid) further reduce friction and generally enhance the reversibility or break loose characteristic of the piston within the cylinder of the gear. Thirdly, repositioning of the guide pin for the valve adjacent the input shaft end of the piston provides improved reversibility of the valve within the piston by obviating the effect of slight deflection of the parts during periods of high dynamic torquing of the steering gear. All of these features, and other features, are fully described and claimed separately, and in combination, in the '063 Sheppard patent.

The desire to further improve the reversibility within the power steering gear thereby bringing about even greater operating efficiencies, lead me to invent the concept covered in the patent application, Power Steering Piston and Cylinder Combination with Plastic Wear Surfaces, Ser. No. 843,976, filed Oct. 20, 1977 now abandoned. This prior invention disclosed and claimed the concept of providing plastic wear surfaces adjacent the ends of the piston to provide an alternative to the fluidized balancing bearings of the '063 patent. The plastic bearing strips are formed of epoxy substantially spanning the distance between the ends of the output rack and the ends of the piston. The concept, which has worked well in use, is a viable alternative to solve the friction problem and to prevent the related slip stick phenomena from arising. The concept relies on the differential molecular structure between the plastic and the metal cylinder wall to prevent slip stick effect; i.e., the different materials prevent tearing and wearing of the parts in this area of highly concentrated frictional forces. In other words, the plastic serves to interrupt the surface of the piston so that the frictionally engaged surfaces at the cylindrical interface do not have matching molecular configurations, thereby preventing the tendency of the surfaces to match and interlock with the deleterious tendency to literally tear away molecules of metal from one part to the other.

During the advanced test program covering the power steering gear with the improvements of the '976 application, as an alternative to the improvements of the '063 Sheppard patent, it was discovered that in addition to the expected increase in efficiency over the original Sheppard '083 design, there was a discovery of an unexpected, even greater efficiency; in the nature of 5–6% greater performance efficiency. Upon close inspection, this was found to occur when the level of the plastics strips was set below the cylindrical surface of the piston. A further careful analysis of the parameters of the invention, that was first brought about by this investigation, thus led me to the present invention. Basically, I have discovered a way to take the best features from the improved piston of the '063 patent and the piston of my improvement patent application '976, and change the oil distribution on and around the piston and/or the valve, to come up with a power steering gear with even greater efficiency than originally anticipated.

OBJECTIVES OF THE INVENTION

Thus, it is the first and primary objective of the present invention to provide a power steering gear utilizing improved fluid distribution means for minimizing friction, cushioning the parts, improving the reversibility and hydraulically preventing slip stick effect with respect to the piston and/or the valve.

It is another and specific object of the present invention to provide a power steering gear wherein plastic inserts at the ends of the piston are not required.

It is another specific object of the invention to produce a power steering gear having superior hydraulic valving and cushion means reducing the friction and counterbalancing the force of the incoming oil of the inlet slot to the piston.

It is another and specific object regarding the valve of the steering gear to provide delivery means feeding from the inlet slot that provides a balancing effect on the valve and insures feeding of oil to the bearing and cushioning means in a rapid and efficient manner so as to prevent starvation in this critical area.

It is still another specific object to the present invention to profide oil delivery means such that the travel time and the loss of pressure enroute to the slots is minimized, thereby assuring the full effect of the valving and cushioning means with improved reversibility at either the start of steering in a static mode, or for the simple change of direction during movement of the vehicle.

It is another object of the present invention to provide the improvement in reversibility wherein the balancing of the spool valve in the center of the piston is complimentary to the balancing of the piston within the cylinder housing of the gear.

It is another object of the present invention to provide oil filled balancing and cushioning means in which the high pressure oil has high capillary attraction within the slot whereby escape of the oil molecules from the slot is prevented, thereby minimizing leakage in the gear.

DISCLOSURE OF THE INVENTION

The present invention is characterized by the provision of shallow oil capillary slots at the ends of a piston of a power steering gear. These slots serve to balance the piston against the opposite hydraulic force provided at the inlet slot of the gear. The trapped oil molecules are retained by capillary attraction within the slots to minimize leakage. This synergistic result is due to the very shallow depth of the slots, preferably 0.001 inch to 0.0025 inch. In other words, the slots are preferably sufficiently shallow to set up a high capillary attraction within the slots thereby providing trapping and blocking of the oil within the slots and preventing deleterious leaking. Slip stick action and frictional wear are effectively prevented and efficiency of the gear is enhanced approximately 5-6% over previous designs. The slots are efficiently fed with high pressure oil from the pump in an improved manner. The feeding of the oil is through a bifurcated delivery passage at the valve within the piston. The shortest possible path to the slots is thus followed for assuring that the slots are filled with oil at all times, especially at the instant when steering commences. At the same time this arrangement provides for balancing of the valve within the piston.

The width of the slot may advantageously be relatively wide since it need only be separated by a small distance from the rack on one side and the end of the piston on the other. Since leakage from the slot is prevented by the phenomena of high capillary attraction, extra space does not have to be allowed to provide for a relatively wide high pressure oil "print" previously found necessary.

The fluid feed grooves along the longitudinal axis of the piston and spaced on opposite sides of the output rack operate substantially as described and claimed in the Sheppard '063 patent but, in addition in my piston, these grooves serve the important function of feeding the shallow capillary slots. Prints are formed along the grooves assisting in the balancing and cushioning action of the piston. The capillary slots greatly improve reversibility or break loose capability of the piston when they are filled with the high pressure oil. This is especially effective in steering the vehicle under the most unfavorable conditions, such as with a fully loaded front axle in deep sand or mud. The maximum output torque needed under these conditions can be realized since (1) there is minimum resistance to movement of the piston due to friction and slip stick effect, and (2) there is maximum high pressure oil to move the piston since any significant leakage is prevented. The length of the slots may vary and still be highly functional, but in the preferred embodiment shown, the slots extend over substantially 120 degrees of the circumference of the piston directly opposite the inlet slot. However, the depth, width and length of the slots described herein provides the optimum balance to the piston within the cylinder and virtually eliminates the slip stick effect along the rack side of the piston, and thus is of substantial importance with respect to the more limited aspects of my invention.

Complimenting the action of the capillary slots to improve reversibility of the gear, and specifically to improve the reversibility of the valve within the piston, is my novel approach of providing the oil delivery or transfer passage within the piston between the inlet slot and the valve by a bifurcated passage. The passage feeds the operational high pressure oil along the sides of the valve so that oil is quickly and efficiently fed around the full periphery of the valve with approximately equal dynamic pressure. This arrangement provides a balance or hydraulic floating of the valve within the valve bore just as the piston is balanced with the cylinder bore of the gear housing.

The net effect of the improvements described is that the piston is able to respond quicker and more efficiently when an input signal is received through the input shaft of the gear. Furthermore, the advantages have been attained while maintaining the non-productive leakage between the piston and the cylinder and around the valve at an absolute minimum, thus making available the full volume of fluid for moving the piston to steer the vehicle.

Both the balancing of the valve and the balancing of the piston are self correcting. As the valve breaks loose or off center by action of the input shaft, the pressure increase is the same in all lateral directions, virtually suspending or floating the two moving parts, that is, the valve and piston. On the piston, the combined force of the action of the output pinion and the rack, the fluid pressure print along the fluid feed groove, and the high pressure oil traped in the capillary slots offsets the force from the high pressure print around the inlet slot. Simultaneously, delivery of the fluid to the sides of the valve, rather than at the top, balances the valve around its full periphery.

Still other objects and advantages of the present invention will be readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF DRAWINGS

FIG. 1 is a cross sectional view taken along the center axis of a Sheppard Power Steering Gear utilizing the new concepts of my invention;

FIG. 2 is a cutaway view along the side of the piston adjacent the output rack showing the capillary slots and the fluid feed grooves;

FIG. 3 is a plan view of the piston on the output rack side showing the feed grooves and the connecting capillary slots;

FIG. 4 is a detailed cross sectional view taken along line 4—4 of FIG. 3 at the end of the piston;

FIG. 5 is a cross sectional view taken along line 5—5 of FIG. 3 at the center of the piston showing the bifurcated oil delivery passage of the present invention; and FIG. 6 is a cross sectional view taken along lines 6—6 of FIG. 3 and showing the opposite end of the piston at a slightly different position.

DETAILED DESCRIPTION OF THE PREFERRED EMBODIMENT

A more complete description and, thus, a more complete understanding of the preferred embodiment of the invention can be realized by reference to the several drawings described above. Beginning with FIG. 1, a power steering gear 10 is shown in sufficient detail to provide the requisite understanding of the invention. The basic parts in which changes have been made to realize my improvement can be seen. Thus, the basic parts of the steering gear include power piston 11, gear housing 12 forming cylinder 13 for the piston 11, bearing cap 14 at one end of the cylinder and cylinder head 15 at the opposite end, output pinion 16 on output shaft 17 operated by output rack 18 on one side of the piston 11, and low pressure exhaust chamber 19 surrounding the output pinion 16 for passage of the low pressure fluid through output port 19a to the sump (not shown) and eventual return to the pump (also not shown).

A spool type distributing valve 20 is mounted within a central bore of the piston 11. The spool-type valve 20 within the piston 11 is fed with incoming high pressure oil through an inlet port 21 that cooperates with an inlet distributing slot 22. The valve 20 is threadedly engaged with the input shaft 23 supported by a suitable bearing 24 by the bearing cap 14. A high pressure seal 25 is provided on the shaft and an outer dirt seal 26 is mounted adjacent the splined end 27 that is designed to receive the connection to the steering shaft of the vehicle. As is well known in the art, the input signal to the steering gear is in the form of rotation of the input shaft 40 and through the threaded engagement with the valve 20, the appropriate distribution of the oil moves the piston 11 to effect steering through the rack 18, the output pinion 16 and the output shaft 17.

The main supply groove around the periphery of the bore within the piston which houses the valve 20 is designated by the reference numeral 30. This main distribution groove 30 is fed by a bifurcated delivery passage 31, that opens into the slot 22. This passage is of particular importance to my invention, and will be described in more detail later.

Annular grooves 35, 36 in the body of the valve 20 split the incoming flow into two equal portions when the gear is in the standby or balanced condition. The flow continues through these peripheral grooves into outer grooves 37, 38 formed in the piston bore. The outer grooves 37, 38 communicate through respective exhaust passages 37a, 38a, to the exhaust chamber 19. Dual pressure feed passageways communicate with the lands between the annular grooves 30, 38 in the piston to feed the bearing cap end of the piston with the high pressure fluid (see passageways 40, 40a in FIG. 4). Similarly, dual feed passageways going to the opposite end of the piston adjacent the cylinder head 50 provides pressurization to move the piston in the opposite direction (note passages 41, 41a of FIG. 6).

Reversing springs 42, 43 are mounted between the ends of the valve 20 and the adjusting nuts 44, 45 threaded into the end of the valve bore, as best shown in FIG. 1. A complete operation of the valve and the distribution of the oil and the operation of the valve reversing springs 42, 43 can be more completely reviewed by reference to the previous Sheppard '063 patent.

Still referring to FIG. 1, it will be realized that the high pressure oil coming into the inlet port 21 provides a lateral force against the piston 11, which lateral force is concentrated along the slot 21 and the print of the oil surrounding the slot as the oil trys to squeeze between the mating cylindrical surfaces. When the piston moves, causing the rack 18 to turn the output pinion 16, the meshing of the teeth tends to cam the piston 11 in the opposite direction. However, this opposite lateral force is not equal to the hydraulic force pushing the piston 11 toward the pinion 16. The fluid balancing and cushioning means of the present invention fills the need to offset the discrepancy.

In this respect, the objectives of the present invention are met by providing a capillary slot 50 at the bearing cap end of the piston, and a similar capillary slot 51 at the cylinder head end of the piston. These slots are filled with high pressure oil through the longitudinally extending feed grooves 52, 53 (see FIGS. 2 and 3).

The depth of these capillary slots at the ends of the piston is critical. As previously indicated, I discovered that making the grooves limited in depth to provide high capillary attraction between the molecules of the oil and the walls of the groove brings about the desired high efficiency operation. Specifically, the slots 50, 51 are preferably within the range of 0.001 inch to 0.0025 inch. At this depth, it has been found that a phenomena occurs that allows the molecules of oil to be firmly retained or trapped within the slots 50, 51. When the molecules cannot escape, leakage of oil is minimized and the efficiency is enhanced considerably.

As steering takes place, and higher and higher pressures occur in the gear, the pressure within the slots 50, 51 also increases so as to substantially offset the increasing pressure along the inlet slot 22. This is desirable since the lateral restoring force is thus self regulating, and provides a piston that is suspended virtually frictonless within the cylinder bore in a very advantageous manner.

Although the phenomena by which the oil is retained within the slots 50,51 may not be fully comprehended at present, it is believed that the extreme shallowness of the slots allows the oil molecules to come into more intimate contact with the bottom of the slots. Thus, the extent of oil molecules stacked on top of the one or two thousandths inch layer or film of oil is minimal. Given the extremely close tolerances held between the piston and cylinder itself, and the natural affinity of the oil molecules for the metal forming the slots 50,51 (capillary attraction), the oil cannot escape. The bottom of the groove is machined without polishing, which further improves the oil retaining characteristic of the slots. The balancing function is thus accomplished (1) with greater efficiency, and (2) withut significant leakage, which is the realization of the best of both prior improvements in one power steering gear structure.

Broadly then, one key to this aspect of my invention lies in making the slots 50,51 sufficiently shallow whereby the capillary action or molecular attraction is enhanced to trap the oil to balance and cushion the cylinder and at the same time prevent leakage.

The slots 50,51 are efficiently fed with high pressure oil through the grooves 52,53 which taper toward the ends to the very shallow depth required in the slots 50,51. It has been found that the feed of oil to the slots 50,51 is highly efficient and provides quick response so as to quickly increase the pressure and balancing force when an input signal is received and steering is necessary. Feed grooves 52,53 are provided with pressurized oil continuously by being connected to the central annular groove 30, as best shown in FIG. 4. The connection between the groove 30 and the feed grooves 52,53 is made through transfer passages 55,56 (see FIG. 5).

The slots 50,51 extend around approximately 120° of the periphery of the piston 11. This further helps to maximize the balancing and cushioning effect to the piston. The width of the slots for optimum performance is approximately 3/16 inch.

A conventional blow down passageway 60 with spring controlled ball valves at each end is provided and also connected to the central pressure groove 30 (see FIG. 4). This passageway 60, thus provides direct relief when the limit of travel of the piston 11 has been reached.

Bifurcated delivery passage, generally designated by the reference numeral 65, having individual flow passages 66,67 connects opposite sides of the central annular groove 30 (see FIG. 5) with the inlet slot 22. Thus, the high pressure oil from the inlet groove 22 is immediately passed to the sides of the valve so as to quickly flow around the periphery of valve 20. In this manner quicker access to the transfer passages 55,56 is obtained. By taking this more direct route to the passageways 55,56 the oil flow to the slots 50,51 through the feed grooves 52,53 is greatly improved, and starving, even under the most unfavorable circumstances, is obviated.

The dynamic pressure of the oil around the valve 20 with this new distribution concept is such that the valve 20 is virtually floated or balanced in the bore of the piston, thus complementing the balancing action of the piston. In prior designs, the high pressure oil coming into the valve bore tends to push the valve toward the output pinion side of the gear. This tendency has been eliminated by my approach, thus greatly improving reversibility of the valve 20.

There is efficiency gain of at least 5–6% in the power steering gear of my invention where the piston 11, as well as the valve 20, are dynamically balanced by the fluid pressure in the system, as described above. The molecules of oil within the very shallow slots 50,51 are trapped by capillary attraction, and thus the tendency for leakage by squeezing of the oil between the outer surface of the piston and the inner surface of the cylinder is obviated. Greater efficiency of the power steering gear comes from thus being able to provide the maximum fluid flow and pressure for movement of the piston within the cylinder.

There are substantial benefits in terms of improving the reversibility of the piston 11 within the cylinder 13 since the slip stick effect is prevented in the critical area at the ends of the piston 11 adjacent the rack 18. Wear is reduced to an insignificant amount and the potential for binding of the parts is virtually eliminated.

In the disclosure there is shown and described only the preferred embodiment of the invention, but, as aforementioned, it is understood that the invention is capable of use in various other combinations and environment and is capable of changes or modifications within the scope of the invention concept as expressed herein.

I claim:

1. An improved piston and cylinder combination of a hydraulic power steering gear comprising a housing defining a cylinder, a piston slidably mounted within the cylinder; a slot formed in at least one of said piston or cylinder at the sliding interface and open only at said interface, and means to feed pressurized hydraulic fluid adjacent the ends of said cylinder to actuate said piston and to said slot to balance and cushion the piston, said slot having a depth of approximately between 0.001 and 0.0025 inch thereby being sufficiently shallow to set up high capillary attraction of the fluid molecules within the slot, whereby the fluid is trapped within the slot and leakage is prevented.

2. The piston and cylinder combination of claim 1 wherein said slot extends at least partially around the piston adjacent the end.

3. The piston and cylinder combination of claim 2 wherein is provided an additional slot extending at least partially around the other end.

4. The piston and cylinder combination of claim 3 wherein said feed means includes grooves extending longitudinally along said piston and connecting with said slots.

5. The piston and cylinder combination of claim 1 wherein said slot is formed on said piston and extends around approximately 120° thereof.

6. The piston and cylinder combination of claim 1 wherein said feed means includes a valve within a bore in the piston, an inlet to supply pressurized fluid to said valve, transfer passage means on the side of said valve opposite to said inlet, and a bifurcated delivery passage communicating with said inlet to direct said fluid around said valve substantially directly to said outlet passage, said fluid from said bifurcated delivery passage flowing around said valve so as to substantially balance the valve within said bore.

7. An integral hydraulic power steering gear having a reciprocating piston, means to feed pressurized hydraulic fluid to said gear to actuate said piston, a valve to selectively distribute pressurized fluid to the ends of the cylinder for steering action, means to provide an outside lateral force on said piston, and at least one shallow slot formed in said piston on the side opposite said force and said slot open only toward the cylinder wall of said cylinder, and means to feed pressurized hydraulic fluid to said slot to balance and cushion said piston, said slot having a depth of approximately between 0.001 and 0.0025 inch thereby being sufficiently shallow to set up sufficient capillary attraction of the fluid molecules within the slot so that the fluid is trapped within the slot and leakage is prevented.

8. The integral power steering gear of claim 7 wherein said slot extends substantially 120° around said piston.

9. The integral power steering gear of claim 8 wherein said slot is formed at one end of the piston and an additional slot is provided at the opposite end of the piston.

10. The integral power steering gear of claim 8 wherein the slot is machined in the surface of said piston, the bottom of said slot being unfinished to increase the attraction of the oil.

* * * * *